BINARY MEMORY DEVICE EMPLOYING FLIP-FLOP THAT IS CONTROLLED BY IN-PHASE DRIVERS
Filed Aug. 3, 1961
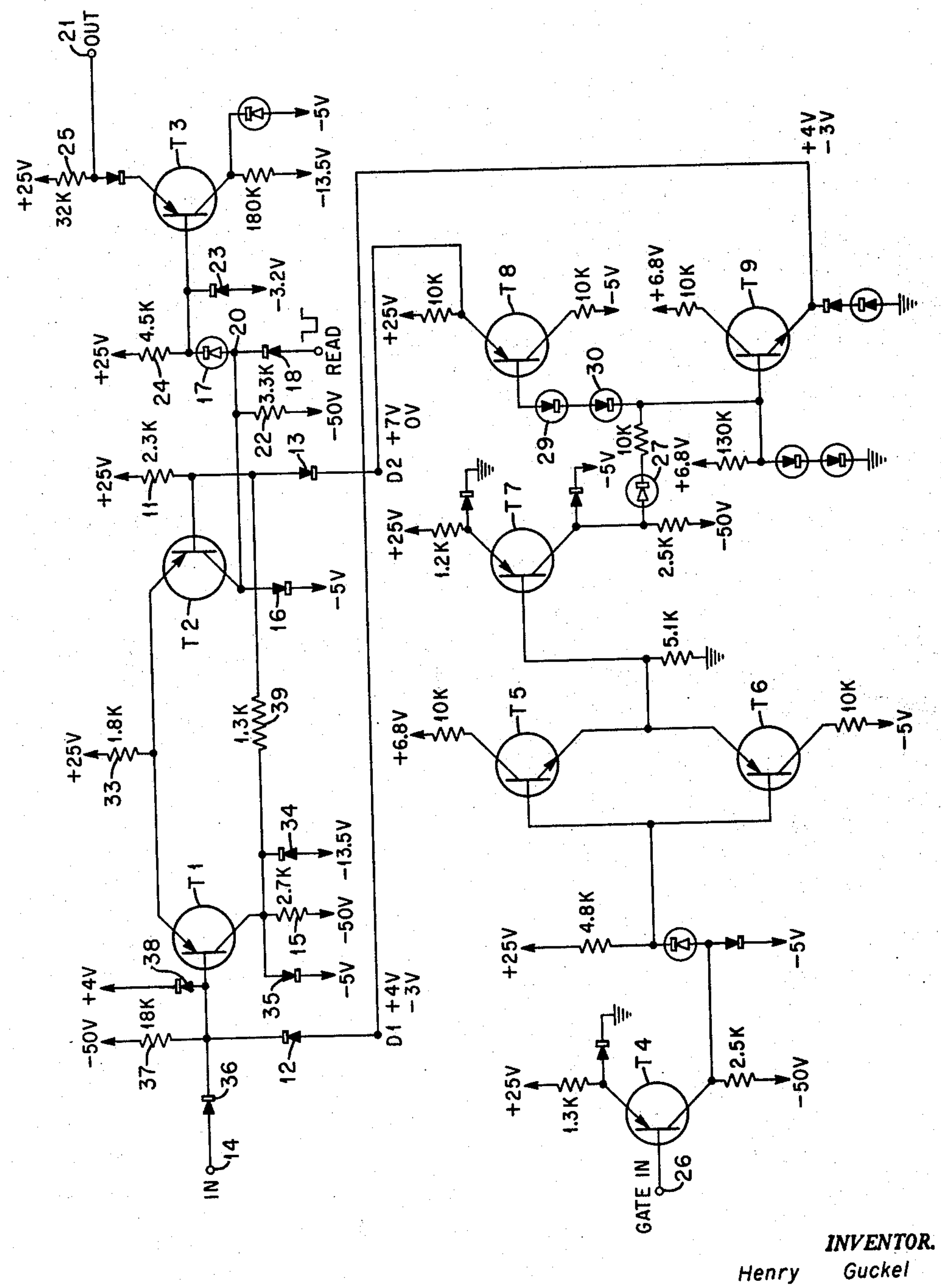
INVENTOR.
Henry Guckel
BY
Roland A. Anderson
ATTORNEY 3,181,004
Patented Apr. 27, 1965

3,181,004

BINARY MEMORY DEVICE EMPLOYING FLIP-FLOP THAT IS CONTROLLED BY IN-PHASE DRIVERS

Henry Guckel, Urbana, Ill., assignor to the United States of America as represented by the United States Atomic Energy Commission Filed Aug. 3, 1961, Ser. No. 129,192
3 Claims. (Cl. 307—88.5)

The present invention relates to binary storage devices, and more especially to a novel gate-flipflop complex for receiving, storing, and reading out information rapidly with inexpensive transistors and a minimum number of components.

In digital computers, one common storage device is a register, made up of flipflops and their associated gates and drivers. Speed and reliability of operation, economy in number of components, use of relatively cheap transistors, and high sensitivity to small gating currents are all goals of the register designer. But in normal flipflops, the stability is proportional to both the gain of the feedback loop and to the size of the input currents, so that small gating currents and high stability are incompatible requirements, and a compromise must be reached.

Accordingly, it is a primary object of this invention to provide a fast, reliable circuit for information storage which does not require the most expensive transistors, yet which is highly stable and is sufficiently sensitive so as to accept reliably small input signals. This and other objects of the invention have been accomplished in the manner described in the following detailed description and shown in the attached drawing.

In this invention, the loop gain is temporarily reduced during the time in which the information to be stored is read in (GATE IN period) so that small input currents may be used to set the flipflop, then the full gain is restored, holding the circuit in the desired state during the NORMAL period. Read out may be accomplished nondestructively at any time except during the GATE IN interval. It has been found that such a system is possible without loss of information, because information read in is stored on the base-emitter diffusion capacitances of the flipflop transistors during the transition period from no loop gain to high loop gain. The circuit "remembers" the state to which it was set long enough for the feedback loop to take over and hold it in that state when the feedback loop gain is restored. A driver circuit having two in-phase outputs is used to reduce the loop gain of the circuit by clamping one point in the loop at a fixed potential, creating temporarily a difference amplifier, then clamping the information input terminal and releasing the other point to allow the loop to function properly.

Referring to the drawing, transistors T1, T2 have their emitters connected together and coupled through resistor 33 to a current source of +25 volts. The collector of T1 is returned to −50 volts through resistor 15, and is clamped between −5 and −13.5 volts by diodes 34, 35. The output is taken from the collector of T2 which is returned to −50 volts through resistor 22. The input signal (±1.5 volts) is applied through diode 36 to the base of T1, which is returned to −50 volts through pull-down resistor 37, and clamped at +4 volts by diode 38. The feedback resistor 39 connects the collector of T1 to the base of T2, which base is connected through resistor 11 to +25 volts.

The two driver inputs are applied simultaneously to the respective bases through diodes 12, 13. Since the signal levels required are 3 volts apart, both driver signals may be derived from the same circuit, across a 3 volt stabistor, for example. In the NORMAL state, D1 is at +4 volts, allowing some current to flow, clamping the base of T1 so it will not accept any signals from input 14, while D2 is at +7 volts, cutting off diode clamp 13 and allowing the base of T2 to move freely. For the GATE IN state, D2 drops to ground and some current flows through the diodes, clamping the base of T2 so it will not follow the feedback resistor 39. D1 drops to −3 volts simultaneously, cutting off current through diode 12, and allowing the base of T1 to swing freely in accordance with the input received at 14.

When the signal at input 14 has been received, T1 is either cut off or conducting, depending on the positive or negative input, and its collector voltage is correspondingly more negative or less negative. When the drivers restore D1 and D2 to +4 and +7 volts, respectively, the base of T1 is clamped at +4 volts, but the base of T2 is free to move. Because of the diffusion capacitance between emitter and base, the circuit will remain in the state to which it was set during GATE IN.

It is preferred that the rise times of the signals at D1 and D2 be equal. It is not essential that this be so, however. It is known that to turn a transistor off, electron injection may occur at the base over a finite interval of time. Expressed otherwise, when the current flowing in the transistor is interrupted, charge redistribution occurs in the base region during a measurable interval due to the charge on the diffusion capacitance between the emitter and base. For conditions where the rise times are not equal, it is sufficient that any reverse bias on the emitter-base of the conducting transistor be removed within that time interval. If so, there can be no change in state of the circuit.

The read out circuit for indicating the state of the bistable circuit may be a CURRENT-OR, with two inputs: (1) the bistable circuit and (2) the driver. Diode 16 serves to keep the transistor T2 out of saturation. The inputs to point 20 are the collector current of T2 and the READ signal, applied through diode 18. The READ driver may be any conventional circuit, preferably using the same basic circuit as the read-in driver, for example, to generate a rectangular gating pulse when an output signal is desired at output 21. The base of transistor T3 is clamped at −3.2 volts through diode 23 and supplied with current through resistor 24 from +25 volts. Zener diode 17 is connected between point 20 and the base of T3, and is rated at 9.1 volts.

The READ input is normally at its more positive value, so that diode 18 conducts. The base potential of T3 is pulled up through resistor 24, so that T3 is off and the emitter potential at output 21 is normally positive. When the READ signal (a negative signal) is received, diode 18 is cut off. Then the potential at point 20 will depend only upon the collector current of T2; if T2 conducts, point 20 will be more positive (−5 volts), but if T2 is off, point 20 will be more negative. The output at 21 will be correspondingly more positive or more negative, indicative of the state of the bistable circuit.

The purpose of transistors T4–T9 is to clamp and release the bases of T1 and T2 substantially simultaneously. When it is desired to gate in or store information, an input signal is applied to input 26, where it is amplified in transistor T4. The output is further amplified through a push-pull amplifier including transistors T5, T6 which may be used to drive several output stages in the event the circuits are combined into a register. The output is further amplified in amplifier T7 and fed through a Zener diode 27 to a double-ended output stage: transistor T8 controls the potential at D2, and transistor T9 controls the potential at D1. Since the output potentials at D1, D2 must be three volts apart, stabistors 29, 30 are used to shift the level of the signal three volts between the bases of transistors T8, T9.

Having thus described my invention, what is claimed as novel is:

1. A binary memory element comprising:

(A) an information storage circuit comprising:

(1) first and second transistors, each having base, emitter and collector electrodes, (2) a feedback resistor connected between the collector of said first transistor and the base of said second transistor, (3) an input terminal connected to the base of said first transistor for receiving binary input signals, (4) an output circuit connected to the collector of said second transistor, (5) a source of energizing potential having a plurality of taps thereon, and (6) resistance means connecting each of said emitters to said source of potential;

(B) first and second diodes provided with anode and cathode electrodes, the cathode of said first diode being connected to the base of said first transistor, and the anode of said second diode being connected to the base of said second transistor;

(C) first and second biasing circuit means connected to respective bases for establishing the potentials at one electrode of each of said diodes and including first and second clamping resistors connecting said bases to respective taps on said potential source; and (D) driver circuit means provided with two outputs connected respectively to the other electrode of each of said diodes for providing first and second unequal higher potential and first and second unequal lower potentials alternately thereto, said higher potentials establishing:

(1) a larger current flow through said first clamping resistor to clamp said first transistor base against input signals, and (2) a smaller current flow through said second clamping resistor to release said second transistor base for control by said feedback resistor;

said lower potentials establishing:

(1) a smaller current flow through said first clamping resistor, releasing said first transistor base to respond to input signals, and (2) a larger current flow through said second clamping resistor to clamp said second transistor base.

2. The device of claim 1 wherein said output circuit comprises a third diode connected to the collector of said second transistor, an input terminal connected to said third diode for receiving signals to alternately forward bias and reverse bias the same, a third transistor having base, emitter and collector electrodes, and an output terminal connected to said emitter electrode, said base electrode being connected to the collector of said second transistor to derive an input voltage therefrom when said third diode is reverse-biased, and said collector electrode being connected to said source of potential.

3. The device of claim 1 wherein said driver circuit means comprises: a first amplifier provided with an input and an output for receiving a control signal; a pair of output amplifiers provided with a common input and respective outputs; said common input being coupled to said first amplifier; said first and second diodes being connected to said respective outputs; and voltage level shifting means connected in circuit with one of said pair of amplifiers.

References Cited by the Examiner

UNITED STATES PATENTS

| | | | |
|---|---|---|---|
| 2,841,705 | 7/58 | Moerman | 328—44 |
| 2,894,215 | 7/59 | Toy | 307—88.5 |
| 3,030,583 | 5/62 | Bicking | 328—207 |

ARTHUR GAUSS, *Primary Examiner.*

JOHN W. HUCKERT, *Examiner.*